United States Patent
Subramanian et al.

(10) Patent No.: US 10,650,015 B2
(45) Date of Patent: May 12, 2020

(54) DYNAMIC MIGRATION OF USER INTERFACE APPLICATION

(71) Applicant: SAP SE, Walldorf (DE)

(72) Inventors: Resmi Kollaparambil Subramanian, Bangalore (IN); Rupali Ray, Bangalore (IN); Aaby Sivakumar, Bangalore (IN)

(73) Assignee: SAP SE, Walldorf (DE)

(*) Notice: Subject to any disclaimer, the term of this patent is extended or adjusted under 35 U.S.C. 154(b) by 633 days.

(21) Appl. No.: 14/964,610

(22) Filed: Dec. 10, 2015

(65) Prior Publication Data
US 2017/0169083 A1 Jun. 15, 2017

(51) Int. Cl.
G06F 7/00 (2006.01)
G06F 16/25 (2019.01)
G06F 16/21 (2019.01)

(52) U.S. Cl.
CPC .......... *G06F 16/254* (2019.01); *G06F 16/214* (2019.01)

(58) Field of Classification Search
None
See application file for complete search history.

(56) References Cited

U.S. PATENT DOCUMENTS

| | | | |
|---|---|---|---|
| 6,604,110 B1 | 8/2003 | Savage et al. | |
| 7,434,200 B2 | 10/2008 | Bender | |
| 7,543,268 B2 | 6/2009 | Cherdron et al. | |
| 7,647,298 B2 | 1/2010 | Adya et al. | |
| 7,650,590 B2 | 1/2010 | Bender | |
| 7,716,634 B2 | 5/2010 | Ross et al. | |
| 8,255,888 B2 | 8/2012 | Jesse et al. | |
| 8,813,024 B2 | 8/2014 | Akkiraju et al. | |
| 8,924,914 B2 | 12/2014 | Boeckenhauer et al. | |
| 8,943,601 B1 | 1/2015 | Zelov et al. | |
| 2006/0143220 A1 | 6/2006 | Spencer, Jr. | |
| 2007/0061513 A1* | 3/2007 | Tsumagari | G06F 3/0605 711/114 |
| 2010/0313182 A1 | 12/2010 | Chen et al. | |
| 2012/0166984 A1 | 6/2012 | Brunswig et al. | |
| 2013/0290880 A1 | 10/2013 | Wu et al. | |
| 2013/0318454 A1* | 11/2013 | Gilboa | G06F 8/38 715/763 |
| 2014/0074891 A1* | 3/2014 | Davis | G06F 7/00 707/791 |
| 2014/0228055 A1* | 8/2014 | Karaoguz | H04W 4/02 455/456.3 |
| 2015/0012498 A1 | 1/2015 | Oberoi et al. | |

* cited by examiner

*Primary Examiner* — Thu N Nguyen
(74) *Attorney, Agent, or Firm* — Buckley, Maschoff & Talwalkar LLC (57) ABSTRACT

Primary tables associated with a first user interface application are received in a migration of user interface application layer. Properties associated with the primary tables and secondary tables are determined. The primary tables and the secondary tables are converted to an entity data model file in a migration system based on the properties associated with the primary tables and the secondary tables. A service and a link to access the service are generated based on the entity data model file. UI controls corresponding to the properties determined from the service are identified in the migration system. A second user interface application with the UI controls is displayed in the enterprise application.

20 Claims, 11 Drawing Sheets

```xml
<?xml version="1.0" encoding="utf-8"?>
<edmx:Edmx Version="1.0" xmlns:edmx="http://schemas.microsoft.com/ado/2007/06/edmx" xmlns:m="http://schemas.microsoft.com/ado/2007/08/dataservices/metadata" xmlns:sap="http://www.sap.com/Protocols/SAPData">
<edmx:DataServices m:DataServiceVersion="2.0">

<Schema Namespace="ZEMPLOYEE_SRV" xml:lang="en" sap:schema-version="0" xmlns="http://schemas.microsoft.com/ado/2008/09/edm">

<EntityType Name="Employee" sap:content-version="1">
<Key><PropertyRef Name="EmployeeID"/></Key>
<Property Name="EmployeeID" Type="Edm.String" Nullable="false" sap:label="Emp ID"/>
<Property Name="Name" Type="Edm.String" Nullable="false" sap:label="Name"/>
<Property Name="EmpDOB" Type="Edm.String" Nullable="false" sap:label="Emp DOB"/>
<Property Name="Gender" Type="Edm.String" Nullable="false" sap:label="Gender"/>
</EntityType>

<EntityType Name="Address" sap:content-version="1">
<Key>
<PropertyRef Name="AddressID"/>
<PropertyRef Name="EmployeeID"/>
</Key>
<Property Name="AddressID" Type="Edm.String" Nullable="false" sap:label="Addr ID"/>
<Property Name="EmployeeID" Type="Edm.String" Nullable="false" sap:label="Emp ID"/>
<Property Name="Address" Type="Edm.String" Nullable="false" sap:label="Addr" />
<Property Name="City" Type="Edm.String" Nullable="false" sap:label="City"/>
<Property Name="Country" Type="Edm.String" Nullable="false" sap:label="Country"/>

<EntityType Name="Assignment" sap:content-version="1">
<Key><PropertyRef Name="EmployeeID"/></Key>
<Property Name="EmployeeID" Type="Edm.String" Nullable="false" sap:label="Emp ID"/>
<Property Name="Department" Type="Edm.String" Nullable="false" sap:label="Department"/>

<Association Name="EmployeeAddress" sap:content-version="1" sap:label="EmployeeAddress">
<End Type="ZEMPLOYEE_SRV.Employee" Multiplicity="1" Role="FromRole_EmployeeAddress"/>
<End Type="ZEMPLOYEE_SRV.Address" Multiplicity="*" Role="ToRole_EmployeeAddress"/></Association>
```

| New 910 | | | |
|---|---|---|---|
| ID 902 | Name 904 | Date of birth 906 | Gender 908 |
| 123 | ABC | 21-Oct-1945 | M |
| 343 | XYZ | 10-Oct-1965 | F |
| 789 | TYU | 9-Sep-1980 | M |

DYNAMIC MIGRATION OF USER INTERFACE APPLICATION

FIELD

Embodiments of the invention generally relate to data processing, and more particularly to methods and systems of dynamic migration of user interface application layer.

BACKGROUND

Enterprises use suite of integrated applications that enable various business processes such as order processing, payroll processing, sales, etc. The integrated enterprise applications may be multi-tiered applications. As technology evolves, user interaction or user experience is constantly improved by providing users with simplistic and personalized user interface applications. Migrating an existing or legacy user interface application in an integrated enterprise application to a personalized user interface application is time intensive and challenging.

BRIEF DESCRIPTION OF THE DRAWINGS

The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 illustrates an exemplary EDM file, according to one embodiment.

DETAILED DESCRIPTION

Embodiments of techniques for dynamic migration of user interface application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
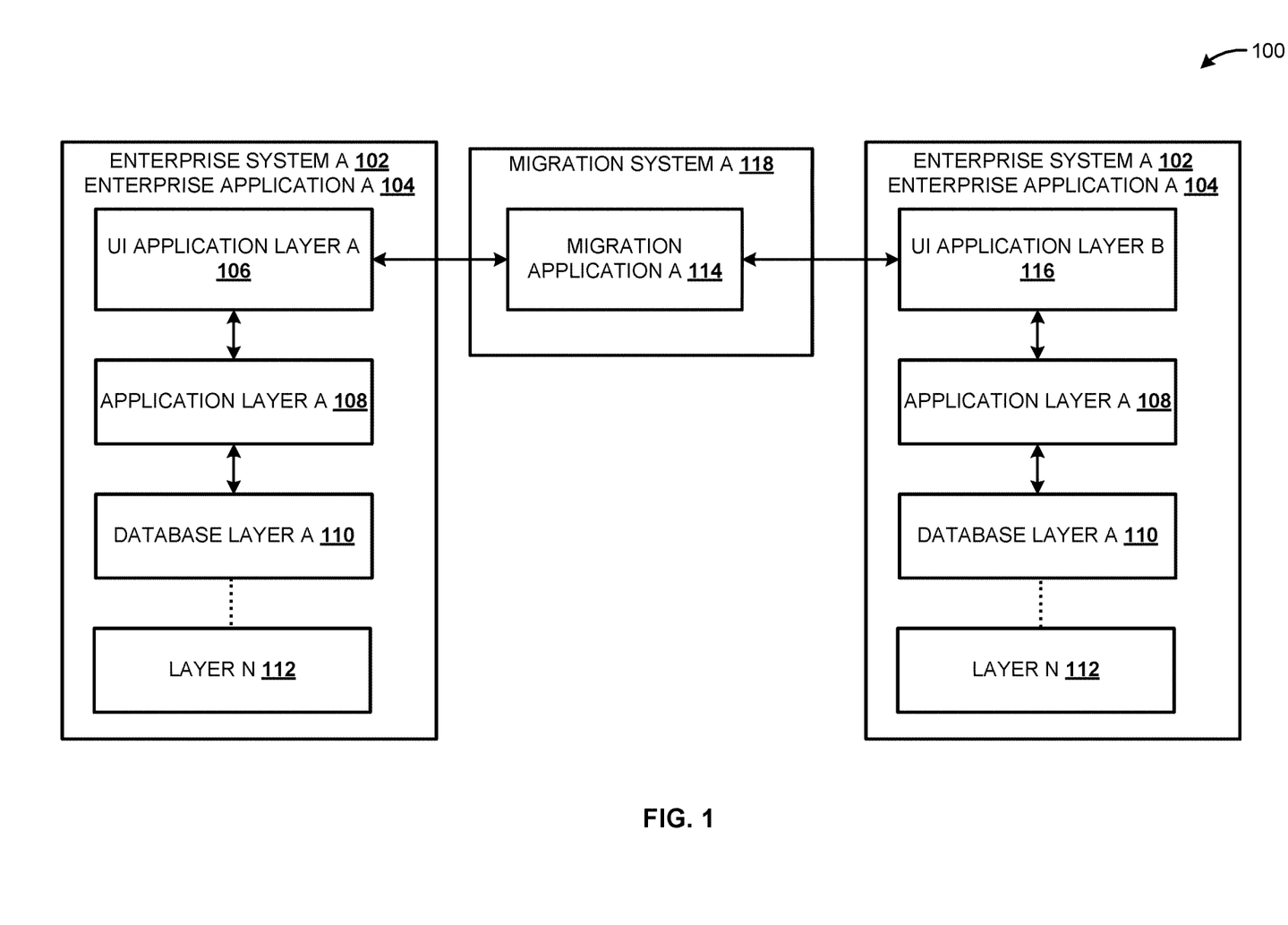
FIG. 1 is a block diagram illustrating an exemplary environment for dynamic migration of user interface application layer, according to one embodiment.

Various enterprise applications such as enterprise resource planning (ERP) applications, customer relationship management (CRM) applications, content management applications, business intelligence applications, database management applications, etc., are developed and used in organizations. The enterprise applications have various functionalities, and provide users with appropriate user interfaces to interact with the enterprise applications. The user interface (UI) application layer of the existing enterprise applications can be migrated to a different or new UI application layer. FIG. 1 is a block diagram illustrating an exemplary environment 100 for dynamic migration of user interface application layer, according to one embodiment. 'Enterprise system A' 102 is shown executing 'enterprise application A' 104 as a multi-tier or multi-layer application with 'UI (user interface) application layer A' 106, 'application layer A' 108, 'database layer A' 110, 'layer N' 112, etc. The 'enterprise system A' 102 may be a specialized enterprise system with hardware components such as high speed processors, physical memory, hard drives, network connections, etc., capable of hosting and executing specialized enterprise software applications such as 'enterprise application A' 104. The 'migration application A' 114 enables migration of 'UI application layer A' 106 in the 'enterprise application A' 104 to 'UI application layer B' 116. 'Migration system A' 118 is shown executing 'migration application A' 114 that enables and ensures seamless migration of 'UI application layer A' 106 to 'UI application layer B' 116 with minimal or no downtime while execution of 'enterprise application A' 104. The 'migration system A' 118 may be a specialized enterprise hardware system with hardware components such as high speed processors, physical memory, hard drives, network connections, etc., capable of hosting and executing specialized enterprise software applications such as 'migration application A' 114.

Figure 2:
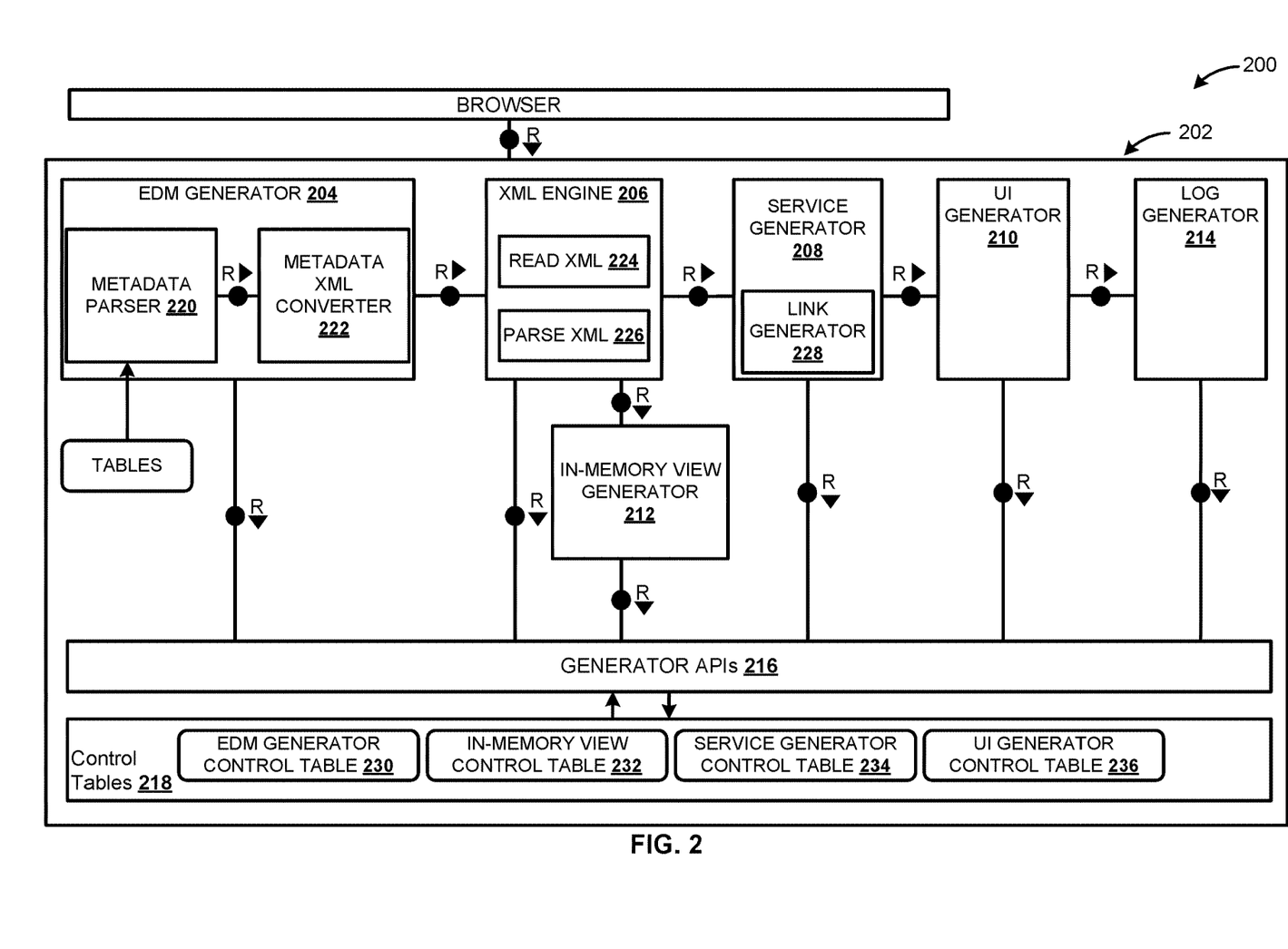
FIG. 2 is a block diagram illustrating components in a migration application, according to one embodiment.

FIG. 2 is block diagram 200 illustrating components in a migration application, according to one embodiment. 'Migration application' 202 executing in a 'migration system' has various components such as 'entity data model (EDM) generator' 204, 'XML engine' 206, 'service generator' 208, 'UI generator' 210, 'in-memory view generator' 212, 'log generator' 214, 'generator APIs' 216 and 'control tables' 218. Generators may be software implementations with application logic along with hardware implementations to enable and support execution of the application logic. 'EDM generator' 204 receives primary tables and related tables such as secondary tables as input, and generates entity data model (EDM) file based on metadata. 'Metadata parser' 220 parses metadata of data in the received tables. 'Metadata XML converter' 222 converts the parsed metadata to an EDM file format. 'Read XML' 224 in the 'XML engine' 206 may read the EDM file, and 'parse XML' 226 may parse the EDM file, and enables the EDM file to be sent to 'in-memory view generator' 212. 'XML engine' 206 may also parse and enable EDM file to be sent to 'service generator' 208. 'Service generator' 208 reads the EDM file and generates services. 'Link generator' 228 in the 'service generator' 208 generates links to access the generated services. 'UI generator' 210 reads the input from the generated services and generates a UI screen based on a style sheet provided as input to the 'UI generator' 210. Individual processes in the 'migration application' 202 are logged in the 'log generator' 214. 'Generator APIs' 216 serves as a communication mechanism between the different generators and the 'control tables' 218. 'Control tables' 218 such as 'EDM generator control table' 230, 'in-memory view control table' 232, 'service generator control table' 234 and 'UI generator control table' 236 are generated for the individual generators, and data corresponding to the generators are stored in the respective control tables.

Figure 3:
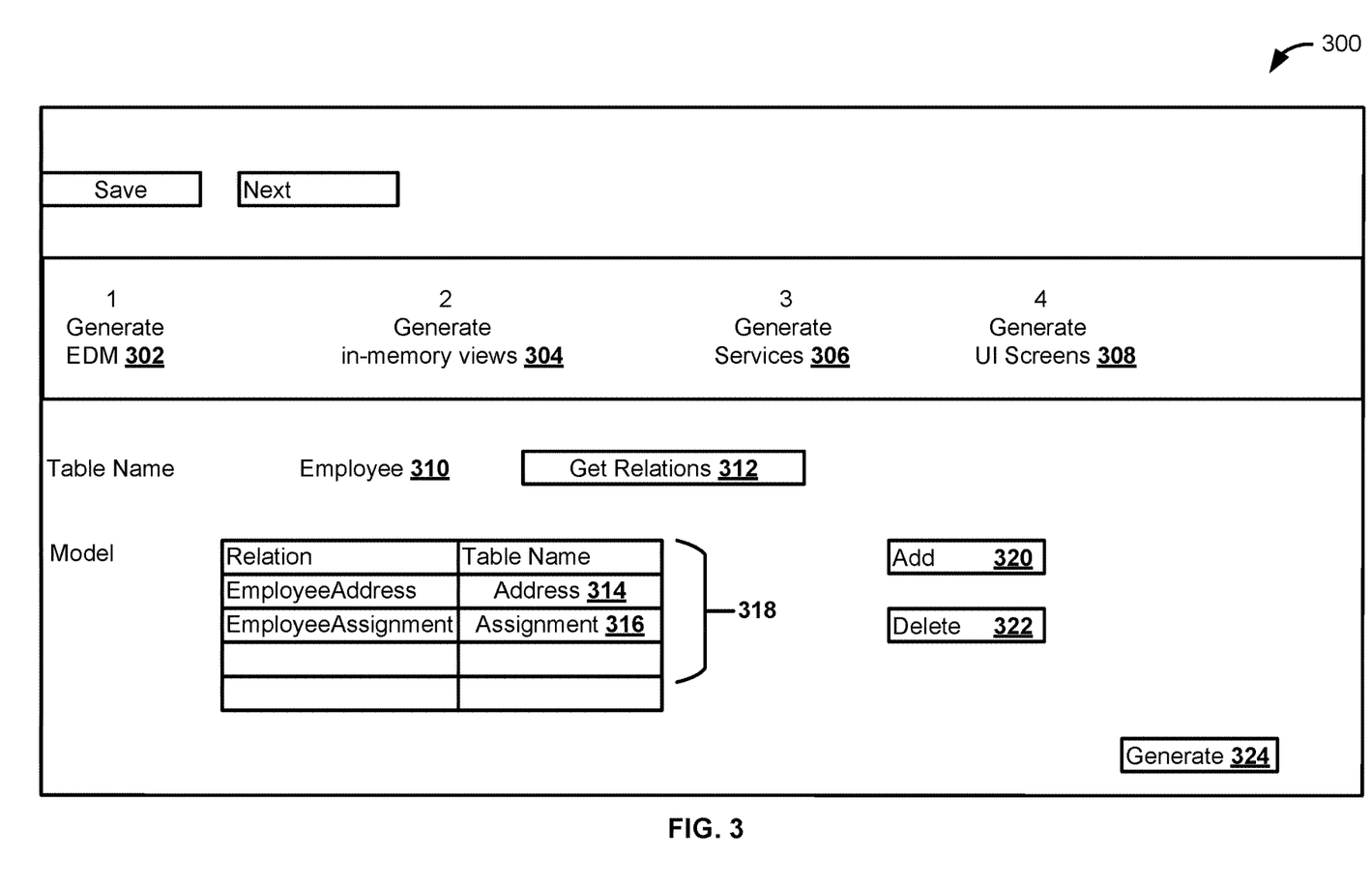
FIG. 3 is a block diagram illustrating user interface of migration application, according to one embodiment.

FIG. 3 is block diagram 300 illustrating user interface of migration application, according to one embodiment. Migration application provides various functionalities such as generate entity data model (EDM) 302, generate in-memory views 304, generate services 306, and generate UI screens 308. In an enterprise application to migrate existing UI screens to different UI screen, tables from the enterprise applications are selected. For example, a table named 'employee' 310 is selected and 'get relations' 312 is clicked. Other tables such as 'address' table 314 and 'assignment' table 316 related to the 'employee' table 310 are retrieved and displayed as shown in table 318. 'Employee' table 310 and 'address' table 314 may have a 1:N association between them. 'Employee' table 310 may have properties or fields such as employee_ID, employee_name, employee_ob, employee_gender, etc. 'Address' table 314 may have properties or fields such as address_ID, address_line, city state, country, etc. Data type and the length of the properties or fields are also specified for both 'employee' table 310 and 'address' table 314. User may manually add additional tables using 'add' button 320 and may remove the previously added tables using 'delete' button 322. When a user clicks on 'generate' button 324, 'employee' table 310 and the related tables 'address' table 314 and 'assignment' table 316 are converted to an EDM file. The EDM file may be in the form of an XML file.

Figure 4:
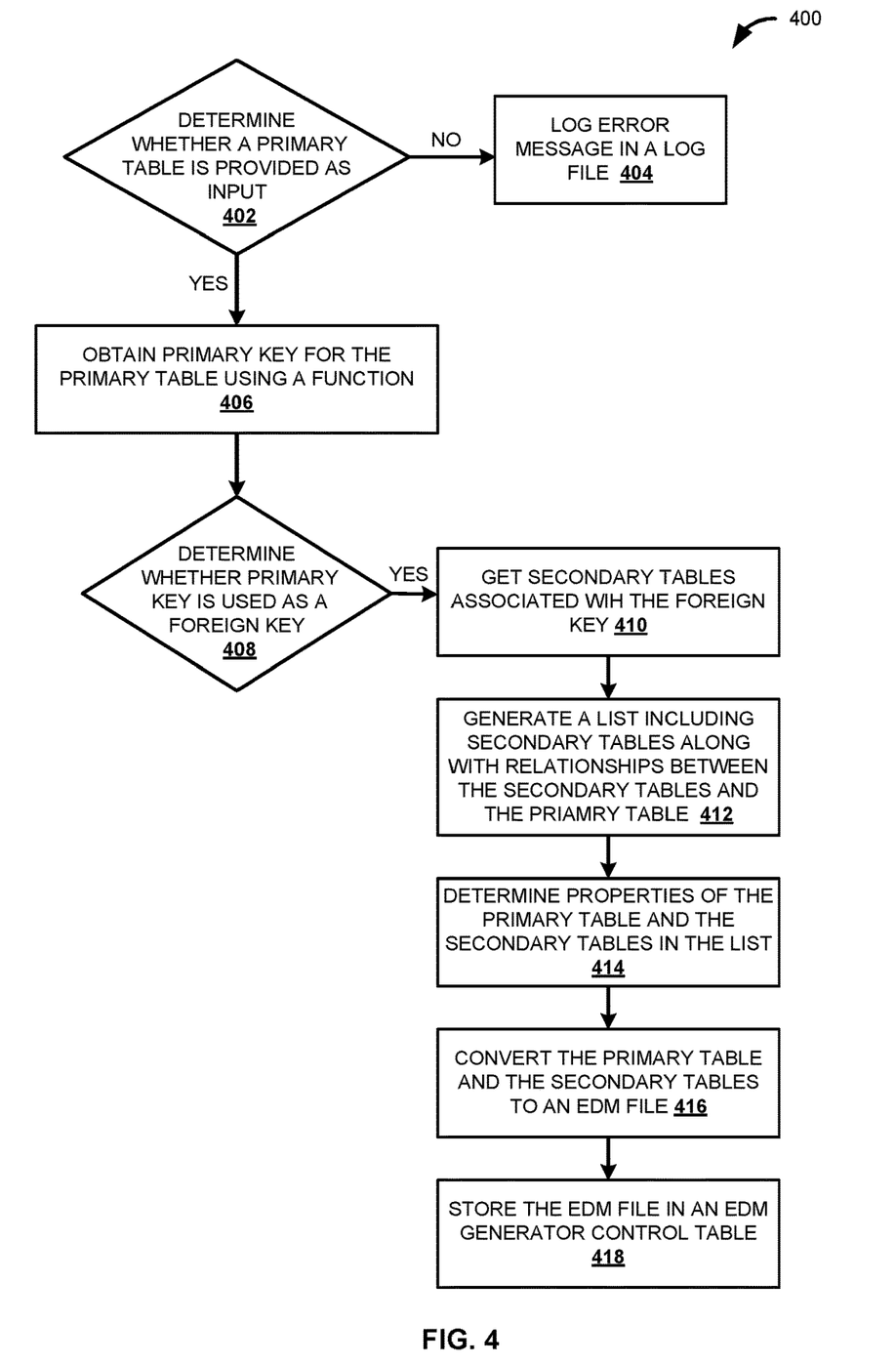
FIG. 4 is a flow diagram illustrating EDM generator, according to one embodiment.

FIG. 4 is flow diagram 400 illustrating EDM generator, according to one embodiment. At 402, it is determined whether a primary table is provided as input. Upon determining that the primary table is not provided as input, at 404, an error message is logged in a log file and the process is terminated. Upon determining that the primary table is provided as input, at 406, a primary key is obtained for the primary table using a function. At 408, it is determined whether the primary key is used as a foreign key. Upon determining that the primary key is used as the foreign key, at 410, secondary tables associated with the foreign key are obtained. At 412, a list is generated including secondary tables along with relationships or associations between the secondary tables and the primary table. At 414, properties of the primary table and the secondary tables in the list are determined. At 416, based on the properties, using XML engine, the primary table and the secondary tables are converted to an EDM file. At 418, the converted EDM file is stored in an EDM generator control table. EDM file format may be in an XML file format.

FIG. 5 illustrates an exemplary EDM file, according to one embodiment. 'Employee_EDM' file 500 generated by an EDM generator is shown containing data associated with primary table named 'employee' table and secondary tables named 'address' table and 'assignment' table along with user defined tags in the form of an XML file. Data associated with individual properties or fields of 'employee' table, 'address' table and the 'assignment' table are specified in the EDM file 500. For example, for the 'employee' table a property EmployeeID is specified as <Property Name="EmployeeID" Type="Edm.String" Nullable="false" sap.label="Emp ID"/> in the EDM file 500. Similarly other properties such as name, date of birth and gender are indicated. Similarly, in 'address' table various properties such as addressID, employeeID, address, city and country are specified in the EDM file 500. Association tag is used to specify association between 'employee' table and 'address' table by indicating multiplicity of associations. Multiplicity may be many-to-many, one-to-many, etc., between the tables in the association.

Figure 6:
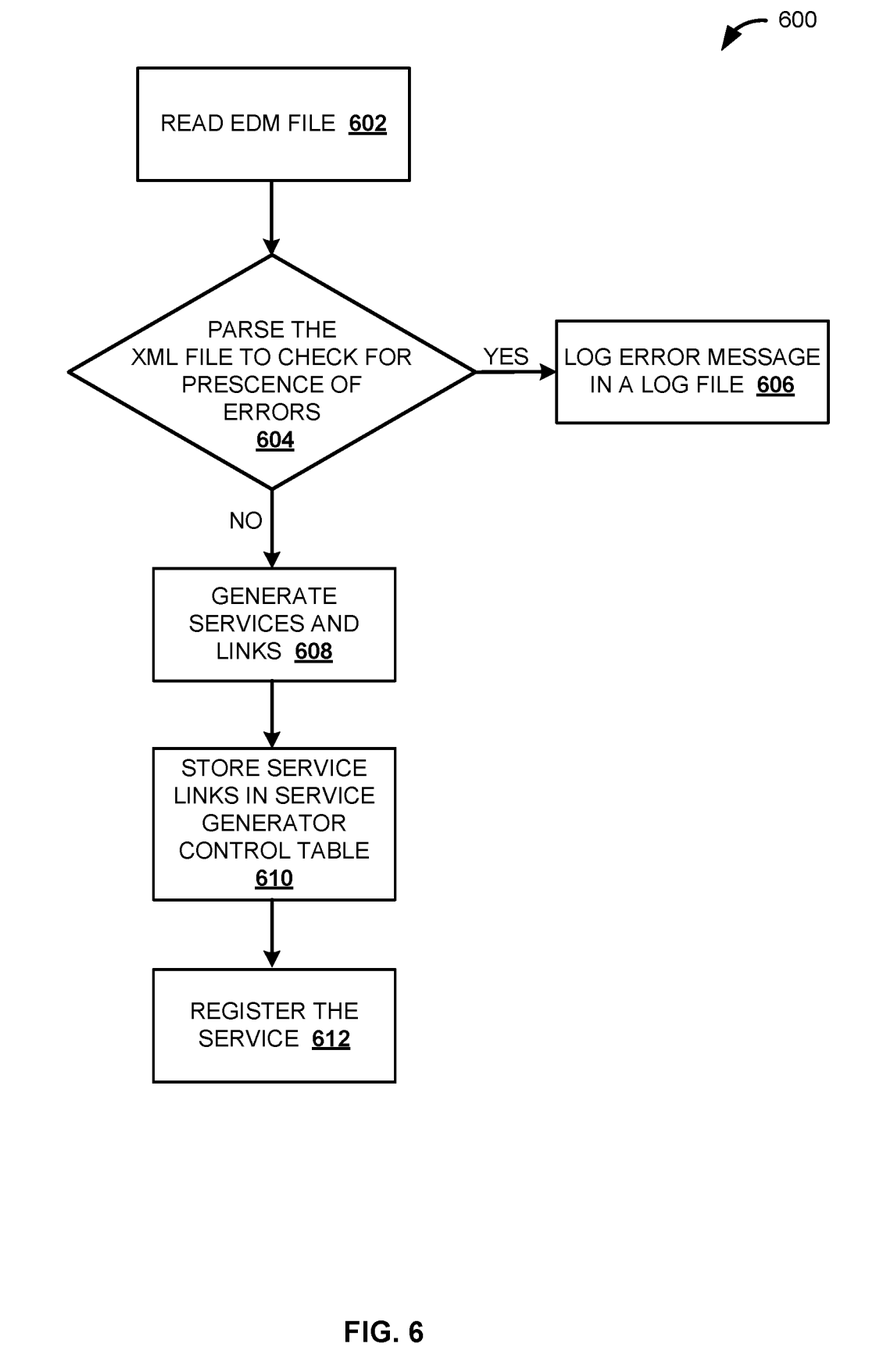
FIG. 6 is a flow diagram illustrating service generator, according to one embodiment.

FIG. 6 is flow diagram 600 illustrating service generator, according to one embodiment. An EDM file is provided as input to the service generator in a user interface of a migration application. At 602, the EDM file named 'employee_EDM' file is read and provided as input to the service generator. At 604, the 'employee_EDM' file is parsed to check for presence of errors. Upon determining presence of errors, at 606, the errors are logged in a log file and the process is terminated. Upon determining that there are no errors in the 'employee_EDM' file, at 608, services and links to access the services are generated. Service 'employee_service' and a link 'http://abc.xyz.com/employee_service_url' to access the service 'employee_service' are generated. At 610, links to access the generated services are stored in a service generator control table. At 612, the services are registered in a server for user access.

Figure 7:
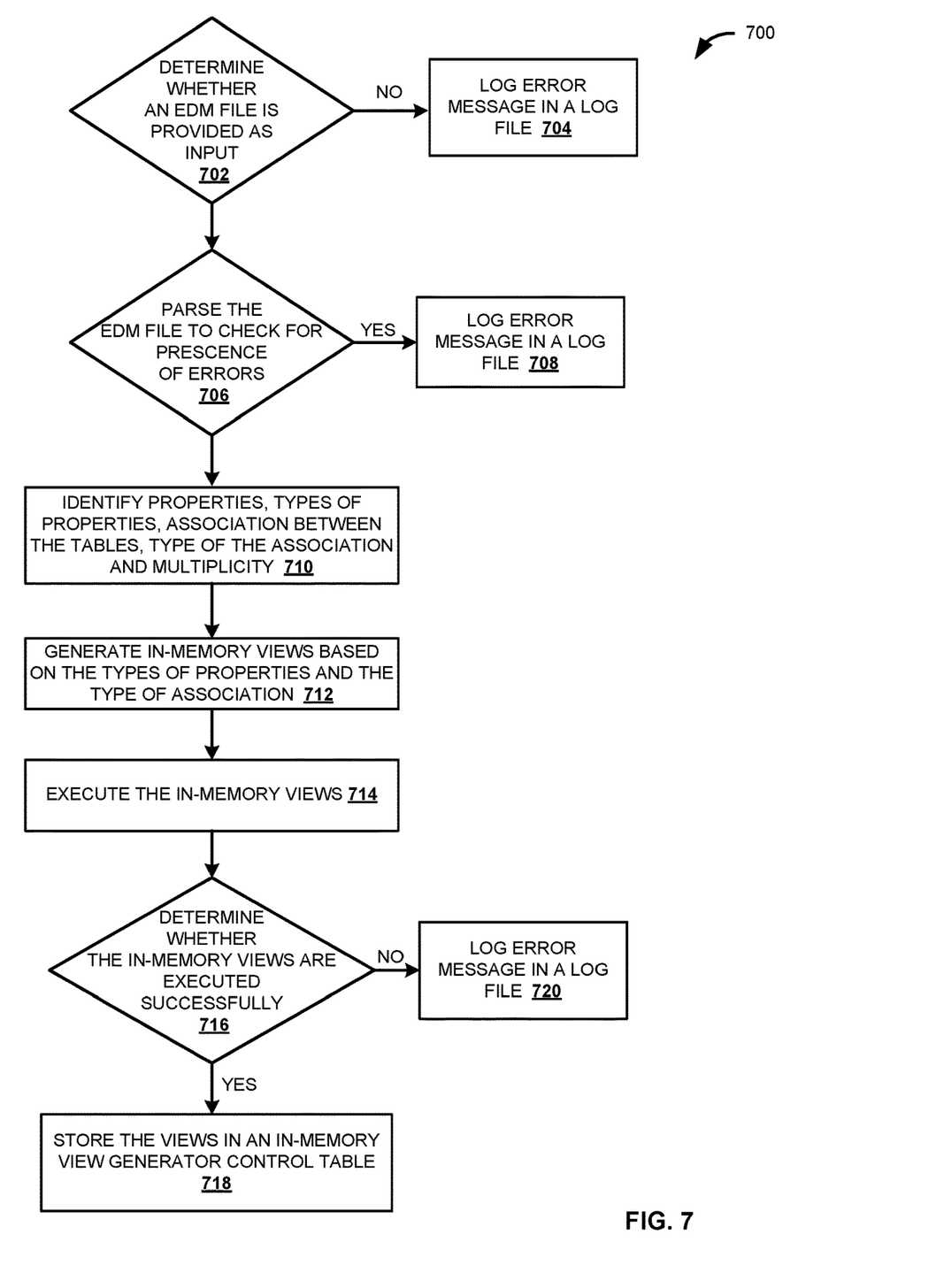
FIG. 7 is a flow diagram illustrating in-memory view generator, according to one embodiment.

FIG. 7 is flow diagram 700 illustrating in-memory view generator, according to one embodiment. At 702, determine whether an EDM file is provided as input. Upon determining that the EDM file is not provided as input, at 704, an error message is logged in a log file and the process is terminated. Upon determining that the EDM file is provided as input, at 706, the EDM file is parsed to check for presence of errors. Upon determining that the EDM file contains errors, at 708, an error message is logged in the log file and the process is terminated. At 710, properties, types of properties, association between the primary and secondary tables, type of the association, multiplicity are identified from the EDM file. At 712, in-memory views are generated based on the types of properties and the type of association. At 714, the in-memory views are executed. At 716, it is determined whether the in-memory views are successfully executed. Upon determining that the in-memory views are successfully executed, at 718, the in-memory views are stored in an in-memory view generator control table. Upon determining that the views are not successfully executed, at 720, the errors are logged in the log file.

Figure 8:
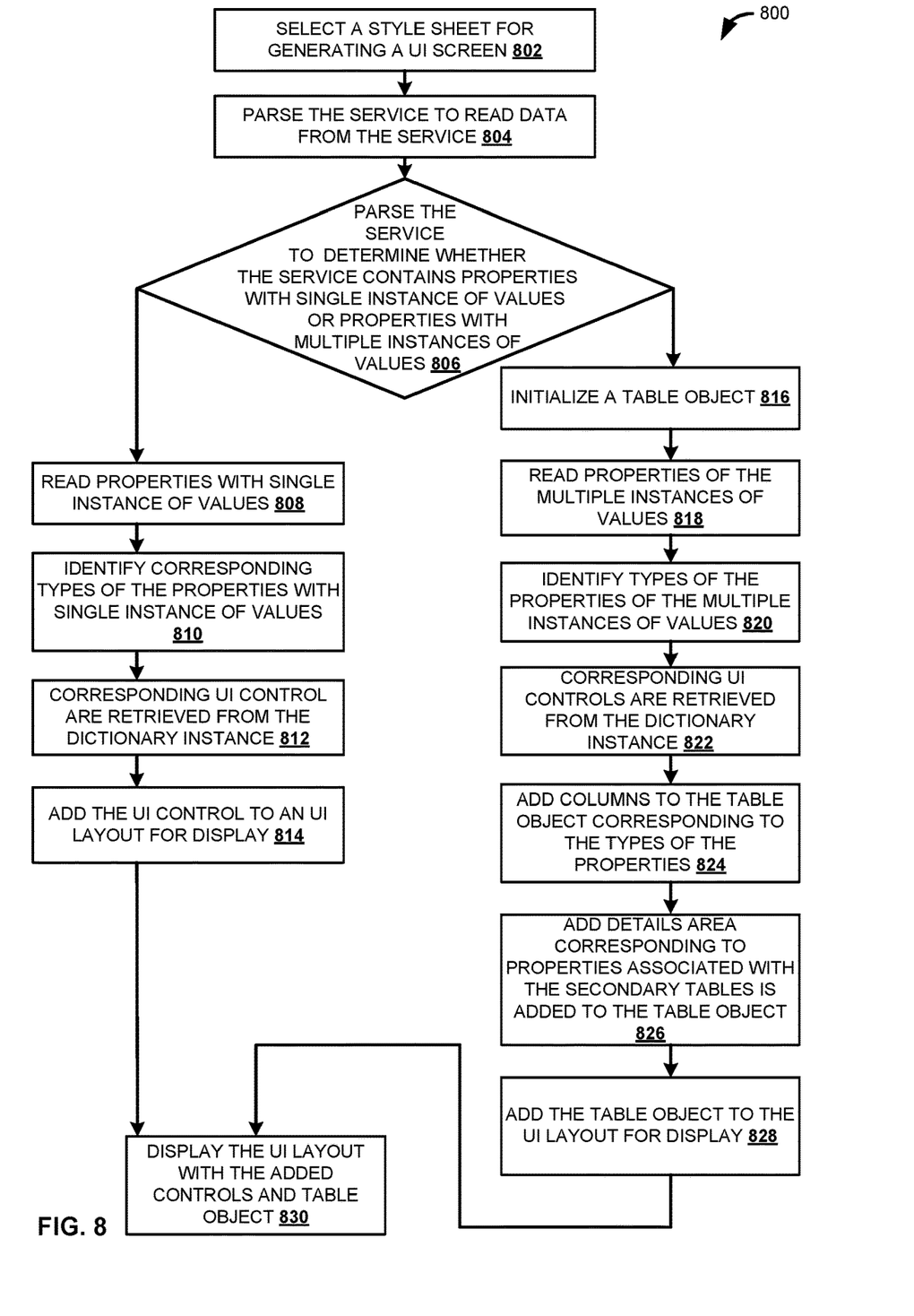
FIG. 8 is a flow chart illustrating UI generator, according to one embodiment.

FIG. 8 is flow chart 800 illustrating UI generator, according to one embodiment. Service 'employee_service' generated as output from a service generator is provided as input to a UI generator. UI generator has a dictionary instance where a mapping between a type of a property and a corresponding UI control is maintained. For example, for a property 'employeeID' of type 'edm.string', a corresponding UI control 'text box' is maintained in the dictionary instance. The appearance of the UI control in a user interface is based on a style sheet selected. Appearance such as size, shape, etc., of the UI control 'text box' is based on the selected style sheet. At 802, a style sheet is selected for generating a UI screen. At 804, the service is parsed to read data from the service. Service 'employee_service' is parsed to read data from the 'employee_service'. At 806, it is determined whether the service contains properties with single instance of values or multiple instances of values. Values corresponding to properties associated with a single employee may be referred to as a single instance of values. Values corresponding to properties associated with multiple employees may be referred to as multiple instances of values. Upon determining that the service contains properties with single instance of values, at 808, properties with single instance of values are read from the service 'employee_service'. At 810, corresponding types of the properties with single instance of values are identified. At 812, for individual property types corresponding UI controls are retrieved from the dictionary instance. At 814, the UI controls are added to a UI layout for display. Upon determining that the service contains multiple instances of values, at 816, a table object to hold the properties of multiple instances of values is initialized. 'Employee_service' contains multiple instances of values corresponding to properties such as employeeID, name, date of birth and gender.

At 818, the properties of multiple instances of values are read. At 820, types of the properties of the multiple instances of values are identified. Types of the properties employeeID, name, date of birth and gender of the multiple instances of values are identified as 'edm_numeric, 'edm_string', 'edm_string', 'edm_date' and edm_string' respectively. At 822, based on the types of the properties corresponding UI controls are retrieved from the dictionary instance. Based on the types of the properties 'edm_numeric, 'edm_string', 'edm_date' and edm_string', corresponding UI controls 'textbox', 'textbox', 'datebox' and 'textbox' are retrieved from the dictionary instance. At 824, for the individual types of the properties corresponding columns are added to the table object. For types of properties 'edm_numeric', 'edm_string', 'edm_date' and edm_string' corresponding columns 'ID', 'Name', 'Date of birth' and 'gender' are added to the table object. At 826, details area corresponding to properties associated with the secondary tables is added to the table object. Details area to display address and assignment associated with an employee may be added to the table object. At 828, the table object is added to the UI layout for display. At 830, the UI layout is displayed with the table object as shown in FIG. 9.

Figure 9:
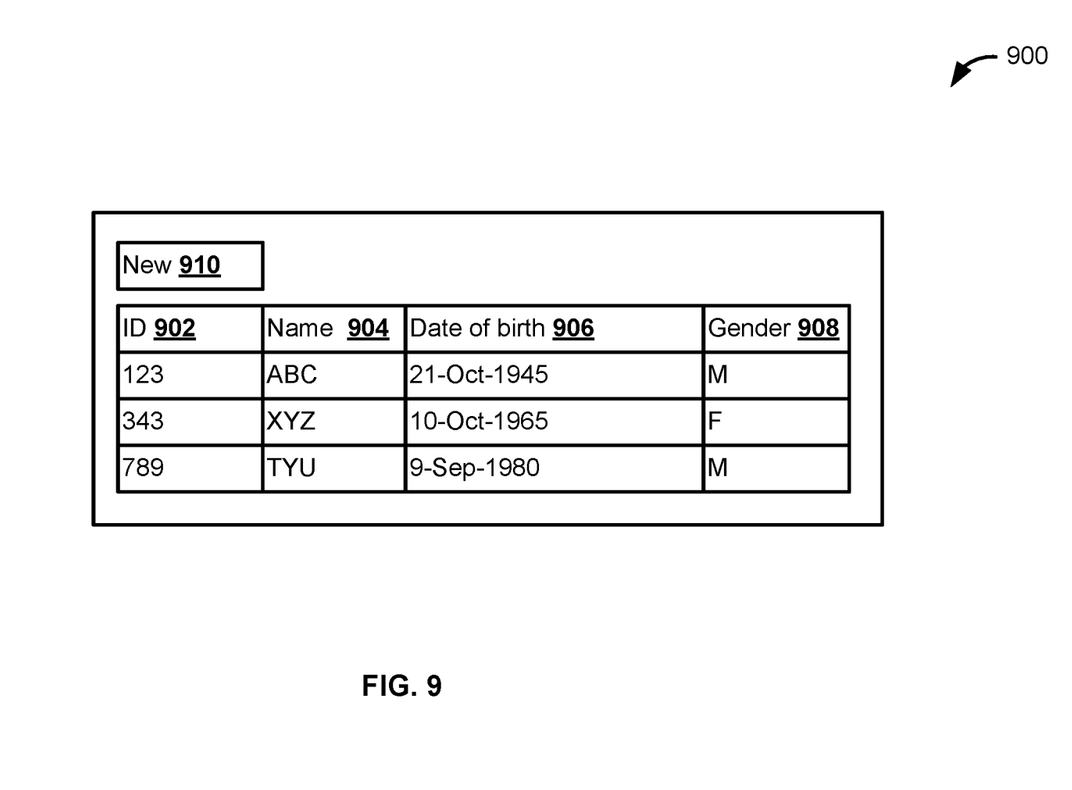
FIG. 9 is a block diagram illustrating migrated UI layout, according to one embodiment.

FIG. 9 is a block diagram 900 illustrating migrated UI layout, according to one embodiment. Based on a default style sheet selected, UI layout including table object is displayed as shown in 900. Properties such as ID 902, name 904, date of birth 906 and gender 908 are displayed in the UI layout with corresponding values. Additional UI controls such as new 910 may also be added to the UI layout and displayed.

Figure 10:
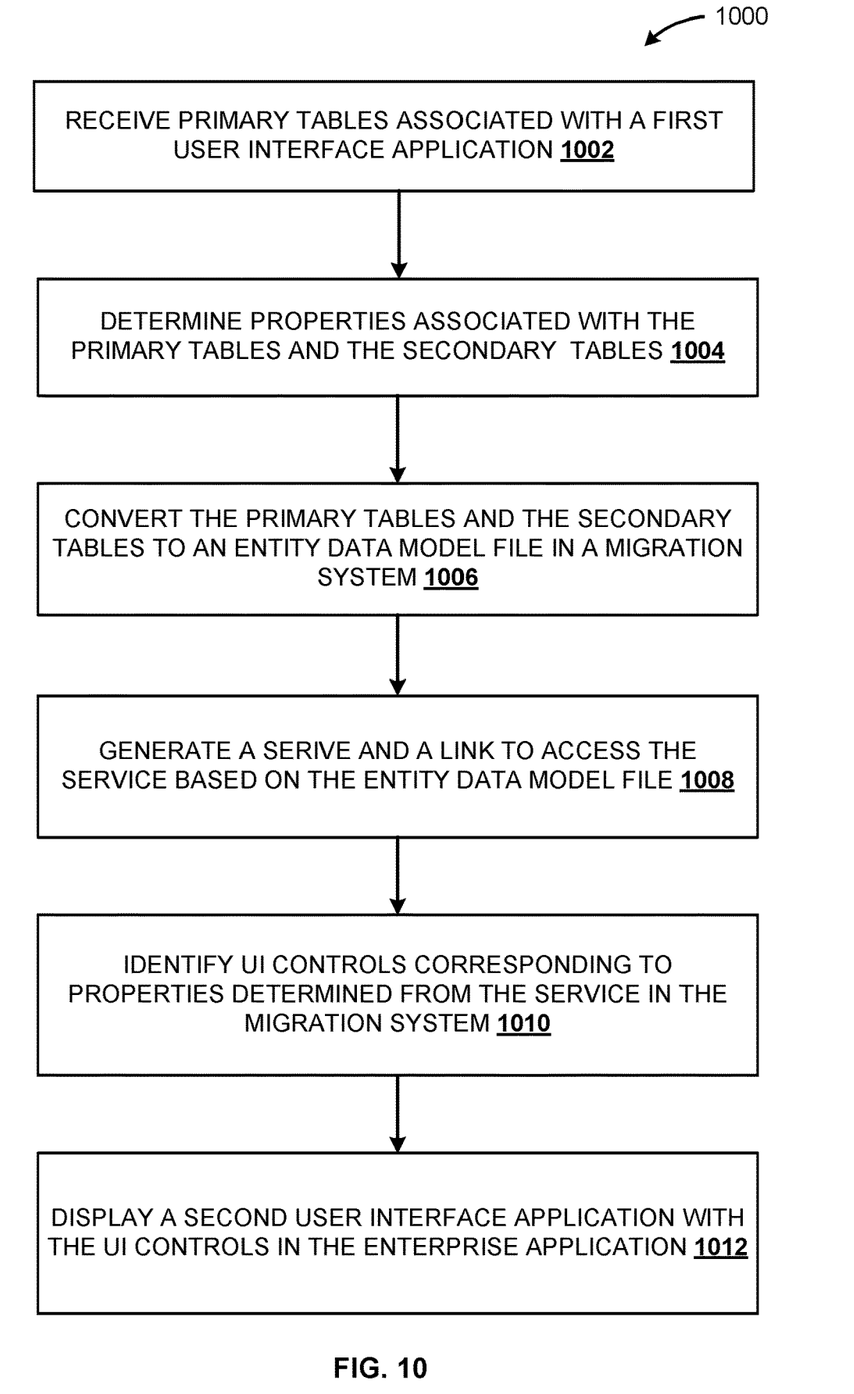
FIG. 10 is a flow chart illustrating migration is user interface application layer, according to one embodiment.

FIG. 10 is flow chart 1000 illustrating migration of user interface application layer, according to one embodiment. At 1002, primary tables associated with a first user interface application are received. At 1004, properties associated with the primary tables and secondary tables are determined. At 1006, the primary tables and the secondary tables are converted to an entity data model file in a migration system based on the properties associated with the primary tables and the secondary tables. At 1008, a service and a link to access the service are generated based on the entity data model file. At 1010, UI controls corresponding to the properties determined from the service is identified in the migration system. At 1012, a second user interface application with the UI controls is displayed in the enterprise application.

Migration application may be available as an installer or executable file packaged and shipped to users along with enterprise applications, or, as a standalone installer or executable file provided to the users. When the users install the migration application, they will be provided with a user interface wizard as shown in FIG. 3.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
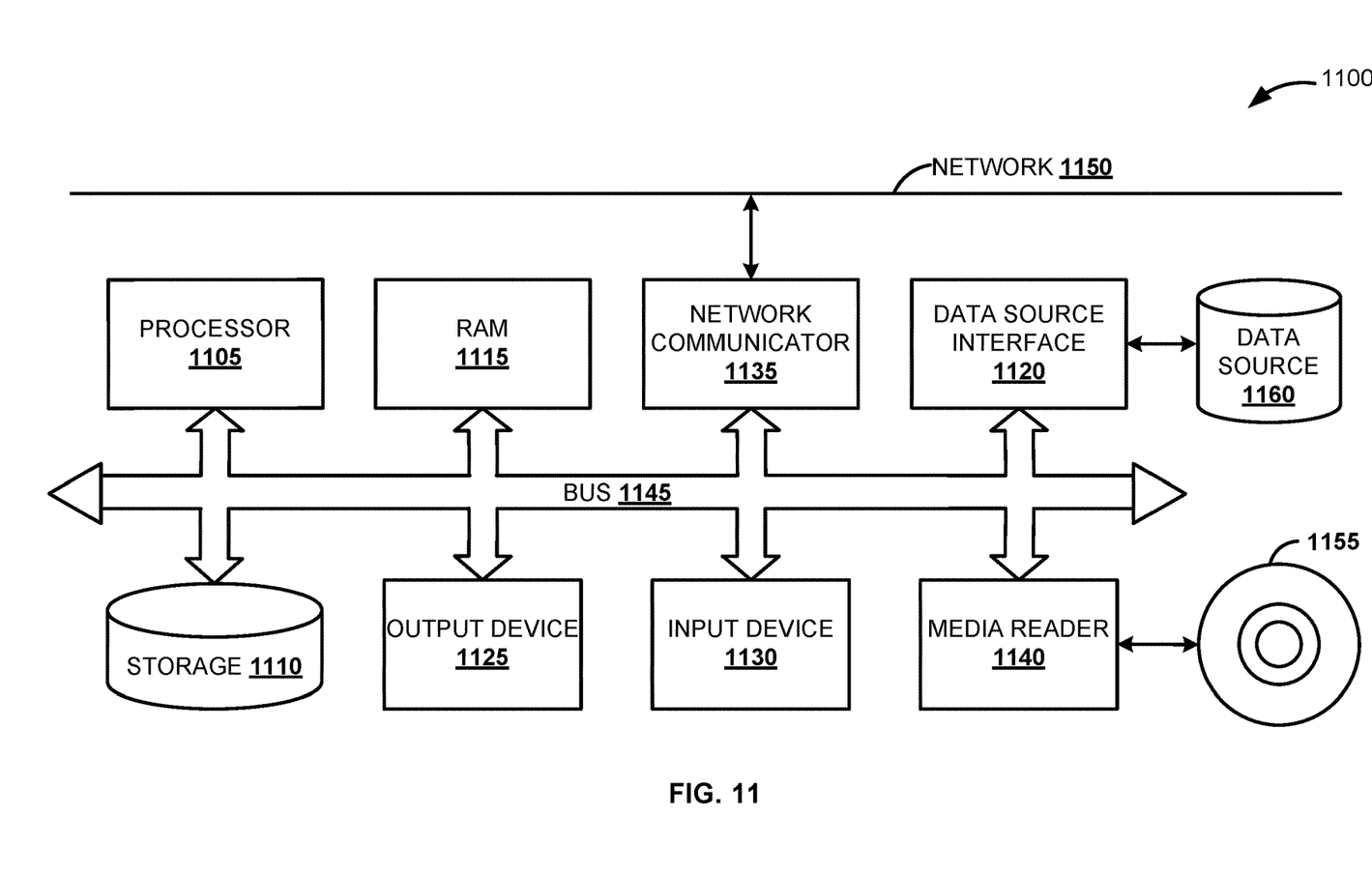
FIG. 11 is a block diagram illustrating an exemplary computer system 1100, according to an embodiment.

FIG. 11 is a block diagram illustrating an exemplary computer system 1100, according to an embodiment. The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, all of the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible within the scope, as those skilled in the relevant art will recognize. These modifications can be made in light of the above detailed description.

What is claimed is:

1. A non-transitory computer-readable medium to store executable instructions, which when executed by a computer, cause the computer to perform operations comprising:

receive primary tables associated with a first user interface (UI) application in a first enterprise application UI layer;

an entity data model generator using metadata of the primary tables to generate an entity data model file based on the metadata by converting the primary tables and received secondary tables in a migration system, metadata properties of data within the primary tables being related to metadata properties within the secondary tables;

a link generator reading the entity data model file;

parsing the entity data model file for errors;

based on a determination that the entity data model file contains errors, terminating the operations;

based on a determination that the entity data model file is error free, generating in the migration system a service and a link to access the service;

identify UI controls corresponding to properties determined from the service in the migration system;

migrate the first user interface application from the first enterprise application UI layer to a second enterprise application UI layer to create a second user interface application at the second enterprise application UI layer; and display the second user interface application with the UI controls in the enterprise application.

2. The computer-readable medium of claim 1, to store instructions, which when executed by the computer, cause the computer to perform operations:

determine properties associated with the primary tables and the secondary tables, wherein conversion of the primary tables and the secondary tables to the entity data model file is based on the properties.

3. The computer-readable medium of claim 1, to store instructions, which when executed by the computer, cause the computer to perform operations:

parse the entity data model file to identify properties, types of the properties and types of associations between the primary table and the secondary tables; and based on the properties, types of the properties and types of the associations, generate in-memory views corresponding to an in-memory database.

4. The computer-readable medium of claim 3, to store instructions, which when executed by the computer, cause the computer to perform operations:

store the in-memory views in an in-memory generator control table.

5. The computer-readable medium of claim 1, to store instructions, which when executed by the computer, cause the computer to perform operations:

parse the service to determine whether the service comprises properties with single instance of values or properties with multiple instances of values;

upon determining that the service comprises properties with single instance of values, identify types of the properties;

retrieve UI controls corresponding to the types of properties from a dictionary instance;

add the UI controls to the second user interface application in the enterprise application; and display the single instance of values in the second user interface application based on the UI controls.

6. The computer-readable medium of claim 1, to store instructions, which when executed by the computer, cause the computer to perform operations:

upon determining that the service comprises properties with multiple instances of values, initialize a table object;

identify types of the properties;

retrieve UI controls corresponding to the types of properties from a dictionary instance;

add the UI controls to the second user interface application in the enterprise application, wherein the properties are added as columns in the table object; and display the multiple instance of values in the second user interface application based on the UI controls in the columns in the table object.

7. The computer-readable medium of claim 1, to store instructions, which when executed by the computer, cause the computer to perform operations:

display properties and values associated with the secondary tables in a details area, wherein the display is associated with the display of the multiple instances of values in the second user interface application.

8. A computer-implemented method of dynamic migration of user interface application layer, the method comprising:

receiving primary tables associated with a first user interface (UI) application in a first enterprise application UI layer;

using metadata of the primary tables to generate an entity data model file based on the metadata by converting the primary tables and received secondary tables in a migration system, metadata properties of data within the primary tables being related to metadata properties within the secondary tables;

reading the entity data model file;

parsing the entity data model file for errors;

based on a determination that the entity data model file contains errors, terminating the operations;

based on a determination that the entity data model file is error free, in the migration system generating a service and a link to access the service;

identifying UI controls corresponding to properties determined from the service in the migration system;

migrating the first user interface application from the first enterprise application UI layer to a second enterprise application UI layer to create a second user interface application at the second enterprise application UI layer; and displaying the second user interface application with the UI controls in the enterprise application.

9. The method of claim 8, further comprising instructions which when executed by the computer further causes the computer to:

determining properties associated with the primary tables and the secondary tables, wherein conversion of the primary tables and the secondary tables to the entity data model file is based on the properties.

10. The method of claim 8, further comprising instructions which when executed by the computer further causes the computer to:

parsing the entity data model file to identify properties, types of the properties and types of associations between the primary table and the secondary tables; and based on the properties, types of the properties and types of the associations, generating in-memory views corresponding to an in-memory database.

11. The method of claim 10, further comprising instructions which when executed by the computer further causes the computer to:

storing the in-memory views in an in-memory generator control table.

12. The method of claim 1, further comprising instructions which when executed by the computer further causes the computer to:

parsing the service to determine whether the service comprises properties with single instance of values or properties with multiple instances of values;

upon determining that the service comprises properties with single instance of values, identifying types of the properties;

retrieving UI controls corresponding to the types of properties from a dictionary instance;

adding the UI controls to the second user interface application in the enterprise application; and displaying the single instance of values in the second user interface application based on the UI controls.

13. The method of claim 8, further comprising instructions which when executed by the computer further causes the computer to:

upon determining that the service comprises properties with multiple instances of values, initializing a table object;

identifying types of the properties;

retrieving UI controls corresponding to the types of properties from a dictionary instance;

adding the UI controls to the second user interface application in the enterprise application, wherein the properties are added as columns in the table object; and displaying the multiple instance of values in the second user interface application based on the UI controls in the columns in the table object.

14. The method of claim 8, further comprising instructions which when executed by the computer further causes the computer to:

displaying properties and values associated with the secondary tables in a details area, wherein the display is associated with the display of the multiple instances of values in the second user interface application.

15. A non-transitory computer-readable medium to store executable instructions, which when executed by a computer, cause the computer to perform operations comprising:

receive primary tables associated with a first user interface (UI) application in a first enterprise application UI layer;

an entity data model generator using metadata of the primary tables to generate an entity data model file based on the metadata by converting the primary tables and received secondary tables in a migration system, metadata properties of data within the primary tables being related to metadata properties within the secondary tables;

a link generator reading the entity data model file;
parsing the entity data model file for errors;
based on a determination that the entity data model file contains errors, terminating the operations;
based on a determination that the entity data model file is error free, generating in the migration system a service and a link to access the service;
identify UI controls corresponding to properties determined from the service in the migration system;
migrate the first user interface application from the first enterprise application UI layer to a second enterprise application UI layer to create a second user interface application at the second enterprise application UI layer; and
display the second user interface application with the UI controls in the enterprise application.

16. The system of claim 15, further comprising instructions which when executed by the computer further causes the computer to:
determine properties associated with the primary tables and the secondary tables, wherein conversion of the primary tables and the secondary tables to the entity data model file is based on the properties.

17. The system of claim 15, further comprising instructions which when executed by the computer further causes the computer to:
parse the entity data model file to identify properties, types of the properties and types of associations between the primary table and the secondary tables; and
based on the properties, types of the properties and types of the associations, generate in-memory views corresponding to an in-memory database.

18. The system of claim 17, wherein, further comprising instructions which when executed by the computer further causes the computer to:
store the in-memory views in an in-memory generator control table.

19. The system of claim 15, further comprising instructions which when executed by the computer further causes the computer to:
parse the service to determine whether the service comprises properties with single instance of values or properties with multiple instances of values;
upon determining that the service comprises properties with single instance of values, identify types of the properties;
retrieve UI controls corresponding to the types of properties from a dictionary instance;
add the UI controls to the second user interface application in the enterprise application; and
display the single instance of values in the second user interface application based on the UI controls.

20. The system of claim 15, further comprising instructions which when executed by the compute further causes the computer to:
upon determining that the service comprises properties with multiple instances of values, initialize a table object;
identify types of the properties;
retrieve UI controls corresponding to the types of properties from a dictionary instance;
add the UI controls to the second user interface application in the enterprise application, wherein the properties are added as columns in the table object; and
display the multiple instance of values in the second user interface application based on the UI controls in the columns in the table object.

* * * * *